US012549412B2

(12) United States Patent
Hessler et al.

(10) Patent No.: US 12,549,412 B2
(45) Date of Patent: Feb. 10, 2026

(54) CHANNEL ESTIMATION IN A WIRELESS COMMUNICATION NETWORK

(71) Applicant: Telefonaktiebolaget LM Ericsson (publ), Stockholm (SE)

(72) Inventors: Martin Hessler, Linköping (SE); Ema Becirovic, Linköping (SE); Emil Björnson, Hägersten (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 554 days.

(21) Appl. No.: 17/921,748

(22) PCT Filed: Apr. 28, 2020

(86) PCT No.: PCT/SE2020/050426
§ 371 (c)(1),
(2) Date: Oct. 27, 2022

(87) PCT Pub. No.: WO2021/221547
PCT Pub. Date: Nov. 4, 2021

(65) Prior Publication Data
US 2023/0164000 A1 May 25, 2023

(51) Int. Cl.
*H04L 25/02* (2006.01)
*H04B 7/06* (2006.01)
*H04L 5/00* (2006.01)

(52) U.S. Cl.
CPC ..... *H04L 25/0204* (2013.01); *H04B 7/06952* (2023.05); *H04L 5/0051* (2013.01)

(58) Field of Classification Search
CPC . H04L 25/0204; H04L 5/0051; H04L 5/0053; H04L 5/0048; H04L 5/0091; H04L 25/0228; H04B 7/0695; H04B 7/0456
See application file for complete search history.

(56) References Cited

U.S. PATENT DOCUMENTS

2006/0239226 A1* 10/2006 Khan ................ H04L 25/03955
370/329
2007/0249296 A1  10/2007 Howard et al.
(Continued)

FOREIGN PATENT DOCUMENTS

WO  2012090078 A1  7/2012
WO  2016122393 A1  8/2016
(Continued)

OTHER PUBLICATIONS

Cui, Qimei, et al., "Hybrid-Pilot Based Downlink CSI Feedback Scheme with Zero-Overhead", IEEE 70th Vehicular Technology Conference, Anchorage, USA, 2009, 1-4.
(Continued)

*Primary Examiner* — Dady Chery
(74) *Attorney, Agent, or Firm* — Murphy, Bilak & Homiller, PLLC

(57) ABSTRACT

A wireless device (14) receives a downlink reference signal (24) from a radio network node (12) over a downlink channel (16), and determines channel information (28) based on measurement of the downlink reference signal (24). The wireless device (14) then transmits, to the radio network node (12) over an uplink channel (18), an uplink signal (30) that implicitly conveys the determined channel information (28). The radio network node (12) jointly (i) identifies which candidate uplink signal in a set (32) of candidate uplink signals (30-1 ... 30-N) is received; and (ii) determines an estimate (42) of the uplink channel (18) from the received uplink signal (30). The radio network node (12) determines the channel information (28) implicitly conveyed by the identified candidate uplink signal, and then determines an estimate (22) of the downlink channel (16) based on the determined channel information (28) and the determined estimate (42) of the uplink channel (18).

16 Claims, 17 Drawing Sheets

(56) References Cited

U.S. PATENT DOCUMENTS

| | | | |
|---|---|---|---|
| 2010/0128683 A1* | 5/2010 | Zangi | H04L 5/0062 |
| | | | 455/450 |
| 2010/0322176 A1 | 12/2010 | Chen et al. | |
| 2013/0301434 A1* | 11/2013 | Krishnamurthy | H04L 5/0053 |
| | | | 370/252 |
| 2015/0029972 A1* | 1/2015 | Park | H04L 1/1896 |
| | | | 370/329 |
| 2015/0146674 A1* | 5/2015 | Krishnamurthy | H04W 72/23 |
| | | | 370/329 |
| 2016/0134438 A1* | 5/2016 | Marzetta | H04L 25/0228 |
| | | | 370/315 |
| 2019/0103949 A1 | 4/2019 | Harrison et al. | |

FOREIGN PATENT DOCUMENTS

| | | |
|---|---|---|
| WO | 2018039527 A1 | 3/2018 |
| WO | 2019089986 A1 | 5/2019 |

OTHER PUBLICATIONS

Ericsson, et al., "Implicit CSI Feedback Framework for DL CoMP", 3GPP TSG-RAN WG1 #69, R1-122835, Prague, Czech Republic, May 21-30, 2012, 1-6.

* cited by examiner

TRANSMITTING, FROM THE RADIO NETWORK NODE TO A WIRELESS DEVICE, A MAPPING THAT MAPS THE DIFFERENT CANDIDATE UPLINK SIGNALS TO DIFFERENT RESPECTIVE CHANNEL INFORMATION
200

TRANSMITTING A DOWNLINK REFERENCE SIGNAL OVER A DOWNLINK CHANNEL
210

RECEIVING AN UPLINK SIGNAL FROM A WIRELESS DEVICE OVER AN UPLINK CHANNEL
220

JOINTLY (I) IDENTIFYING WHICH CANDIDATE UPLINK SIGNAL IN A SET OF CANDIDATE UPLINK SIGNALS IS THE RECEIVED UPLINK SIGNAL; AND (II) DETERMINING AN ESTIMATE OF THE UPLINK CHANNEL FROM THE RECEIVED UPLINK SIGNAL
230

DETERMINING CHANNEL INFORMATION IMPLICITLY CONVEYED BY THE IDENTIFIED CANDIDATE UPLINK SIGNAL, WHERE DIFFERENT CANDIDATE UPLINK SIGNALS IN THE SET IMPLICITLY CONVEY DIFFERENT CHANNEL INFORMATION
240

DETERMINING AN ESTIMATE OF THE DOWNLINK CHANNEL BASED ON THE DETERMINED CHANNEL INFORMATION AND THE DETERMINED ESTIMATE OF THE UPLINK CHANNEL
250

BASED ON THE DETERMINED ESTIMATE OF THE DOWNLINK CHANNEL, PRECODING A DOWNLINK TRANSMISSION TO THE WIRELESS DEVICE
260

TRANSMITTING THE PRECODED DOWNLINK TRANSMISSION TO THE WIRELESS DEVICE OVER THE DOWNLINK CHANNEL
270

*FIGURE 6*

CHANNEL ESTIMATION IN A WIRELESS COMMUNICATION NETWORK

TECHNICAL FIELD

The present application relates generally to a wireless communication network, and relates more particularly to channel estimation in such a network.

BACKGROUND

A Multiple-Input Multiple-Output (MIMO) wireless communication system exploits the spatial dimension of the communication channel to send multiple transmissions in parallel on at least partly overlapping time and frequency resources. In so-called massive MIMO, for example, a radio network node equipped with multiple antennas serves multiple wireless devices simultaneously, in the same time-frequency resource, using spatial multiplexing. The radio network node in this regard precodes a downlink transmission to each wireless device based on an estimate of the downlink channel for that device, in order to cancel multi-user interference and realize significant performance gains.

Different approaches exist for the radio network node to obtain the downlink channel estimates needed for downlink transmission precoding. According to pure codebook-based precoding, each wireless device explicitly transmits to the radio network node channel information that the device determined from measurement of a downlink reference signal. Especially as the number of antennas grows in massive MIMO, though, this approach is resource intensive as it requires significant uplink resources for channel information feedback, as well as downlink resources for the downlink reference signal. Pure reciprocity-based precoding is less resource intensive. According to pure reciprocity-based precoding, each wireless device transmits an uplink reference signal to the radio network node and the radio network node exploits downlink-uplink reciprocity in order to determine downlink channel estimates from the uplink reference signals. However, the relatively lower transmit power of wireless devices compared to the radio network node practically limits reciprocity-based precoding to use with wireless devices near the center of the radio network node's coverage area, where both uplink and downlink signal qualities are sufficiently high. Indeed, if a downlink channel estimate derived from an unreliable uplink channel estimate is used for downlink transmission precoding, a large part of the beamforming gain will be lost due to beam misalignment and the ability to spatially suppress interference will be reduced. This means that the performance gains from spatial multiplexing will be low or non-existent. If cell-edge devices focus their transmit power in a small fraction of the frequency band, the quality of the uplink channel estimates and thereby interference suppression will improve, but at the expense of greatly reduced data rate due to a reduction in frequency bandwidth.

Challenges therefore exist in obtaining channel estimates for precoding downlink transmissions to wireless devices over a wide coverage area, in a way that conserves resources and increases data rate.

SUMMARY

According to some embodiments herein, a radio network node obtains a downlink channel estimate by exploiting a combination of uplink-downlink reciprocity and channel information feedback. In particular, a wireless device transmits an uplink signal (e.g., an uplink reference signal) from which the radio network node can determine an uplink channel estimate. Notably, without any additional cost in uplink resources, this uplink signal also implicitly conveys channel information that the wireless device determined from a downlink reference signal. The wireless device may, for example, select which uplink signal to transmit from a set of candidate uplink signals that implicitly convey different respective channel information. The radio network node in such a case may jointly (i) identify which candidate uplink signal is received; and (ii) determine an uplink channel estimate from the uplink signal. The radio network node may then exploit uplink-downlink reciprocity to determine the downlink channel estimate from the uplink channel estimate and from the implicitly conveyed channel information. The implicitly conveyed channel information advantageously increases the accuracy of this downlink channel estimate, without requiring additional uplink resources or transmit power to feed back that information. With more accurate downlink channel estimation, then, the radio network node may precode downlink transmissions with improved multi-user interference cancellation, even for wireless devices with low signal quality, such as those devices at the cell edge.

More particularly, embodiments herein include a method performed by a wireless device. The method includes receiving a downlink reference signal from a radio network node over a downlink channel. The method further includes determining channel information based on measurement of the downlink reference signal. The method may then include transmitting, to the radio network node over an uplink channel, an uplink signal (e.g., an uplink reference signal) that implicitly conveys the determined channel information.

In some embodiments, the uplink signal is a sounding reference signal.

In other embodiments, the uplink signal is a random access preamble.

In some embodiments, the channel information is, or encodes, a quantized estimate of the uplink channel or the downlink channel.

In some embodiments, the downlink reference signal is received, and the uplink reference signal is transmitted, using time division duplexing (TDD). Alternatively or additionally, the downlink channel is, or is assumed to be, fully reciprocal with the uplink channel.

In some embodiments, the method also comprises selecting, from among multiple candidate uplink signals (e.g., multiple candidate uplink reference signals) in a set, the uplink signal to transmit, based on the determined channel information. In this case, the different candidate uplink signals in the set may implicitly convey different respective channel information. In one embodiment, the set is a finite set of pairwise orthogonal uplink signals. In another embodiment, by contrast, the set is a finite set of uplink signals that includes at least some uplink signals which are not pairwise orthogonal but all pairs of uplink signals in the set have a correlation below a threshold. Alternatively or additionally, the different candidate uplink signals in the set may use different uplink signal resources, where the different uplink signal resources include different signal sequences, different time resources, different frequency combs, different frequency patterns, and/or different cyclic shifts. Alternatively or additionally, in some embodiments, the different candidate uplink signals are candidate uplink reference signals or are different random access preambles.

Regardless, in one or more embodiments, the method alternatively or additionally includes receiving, from the radio network node, a mapping that maps the different candidate uplink signals to different respective channel information. In this case, selecting the uplink signal to transmit may be based on the mapping.

In some embodiments, the number of candidate uplink signals in the set is less than or equal to $$v = \frac{B}{N},$$

where B is a number of beams over which the radio network node is configured to transmit and where N is a number of transmit antennas at the radio network node.

In some embodiments, the method further comprises, after transmitting the uplink reference signal, receiving, from the radio network node over the downlink channel, a precoded downlink transmission that is precoded based on the determined channel information. In one such embodiment, the precoded downlink transmission includes a downlink reference signal, where the downlink reference signal is based on the transmitted uplink reference signal.

Embodiments herein also include a method performed by a radio network node. The method includes transmitting a downlink reference signal over a downlink channel. The method also includes receiving an uplink signal from a wireless device over an uplink channel. The method further includes jointly (i) identifying which candidate uplink signal in a set of candidate uplink signals is the received uplink signal; and (ii) determining an estimate of the uplink channel from the received uplink signal. The method may further include determining channel information implicitly conveyed by the identified candidate uplink signal, where different candidate uplink signals in the set implicitly convey different channel information. The method may also include determining an estimate of the downlink channel based on the determined channel information and the determined estimate of the uplink channel.

In some embodiments, the method further includes transmitting, to the wireless device, a mapping that maps the different candidate uplink signals in the set to different respective channel information. In this case, determining the channel information implicitly conveyed by the identified candidate uplink signal may comprise mapping the identified candidate uplink signal to channel information according to the mapping.

In some embodiments, jointly identifying and determining may be performed such that the identified candidate uplink signal implicitly conveys channel information that corresponds to the determined estimate of the uplink channel.

In one embodiment, the set is a finite set of pairwise orthogonal uplink signals. In another embodiment, by contrast, the set is a finite set of uplink signals that includes at least some uplink signals which are not pairwise orthogonal but all pairs of uplink signals in the set have a correlation below a threshold. Alternatively or additionally, the different candidate uplink signals in the set may use different uplink signal resources, where the different uplink signal resources include different signal sequences, different time resources, different frequency combs, different frequency patterns, and/or different cyclic shifts. Alternatively or additionally, in some embodiments, the different candidate uplink signals are candidate uplink reference signals or are different random access preambles.

In some embodiments, the uplink signal is a sounding reference signal.

In other embodiments, the uplink signal is a random access preamble.

In some embodiments, the channel information is, or encodes, a quantized estimate of the uplink channel or the downlink channel.

In some embodiments, the downlink reference signal is received, and the uplink reference signal is transmitted, using time division duplexing (TDD). Alternatively or additionally, the downlink channel is, or is assumed to be, fully reciprocal with the uplink channel.

Regardless, in one or more embodiments, the method alternatively or additionally includes, based on the determined estimate of the downlink channel, precoding a downlink transmission to the wireless device; and transmitting the precoded downlink transmission to the wireless device over the downlink channel. In one such embodiment, the precoded downlink transmission includes a downlink reference signal, in which case the method may further comprise selecting the downlink reference signal based on the identified candidate uplink signal.

In some embodiments, the number of candidate uplink signals in the set is less than or equal to $$v = \frac{B}{N},$$

where B is a number of beams over which the radio network node is configured to transmit and where N is a number of transmit antennas at the radio network node.

Embodiments moreover include corresponding apparatus, computer programs, and carriers of those computer programs. For example, embodiments herein include a wireless device, e.g., comprising communication circuitry and processing circuitry. The wireless device is configured to receive a downlink reference signal from a radio network node over a downlink channel. The wireless device is further configured to determine channel information based on measurement of the downlink reference signal. The wireless device may also be configured to transmit, to the radio network node over an uplink channel, an uplink signal (e.g., an uplink reference signal) that implicitly conveys the determined channel information.

Embodiments also include a radio network node, e.g., comprising communication circuitry and processing circuitry. The radio network node is configured to transmit a downlink reference signal over a downlink channel, and to receive an uplink signal from a wireless device over an uplink channel. The radio network node is further configured to jointly (i) identify which candidate uplink signal in a set of candidate uplink signals is the received uplink signal; and (ii) determine an estimate of the uplink channel from the received uplink signal. The radio network node may further be configured to determine channel information implicitly conveyed by the identified candidate uplink signal, where different candidate uplink signals in the set implicitly convey different channel information. The radio network node may also be configured to determine an estimate of the downlink channel based on the determined channel information and the determined estimate of the uplink channel.

BRIEF DESCRIPTION OF THE DRAWINGS

FIG. 6 is a logic flow diagram of a method performed by a radio network node according to some embodiments.

DETAILED DESCRIPTION

Figure 1:
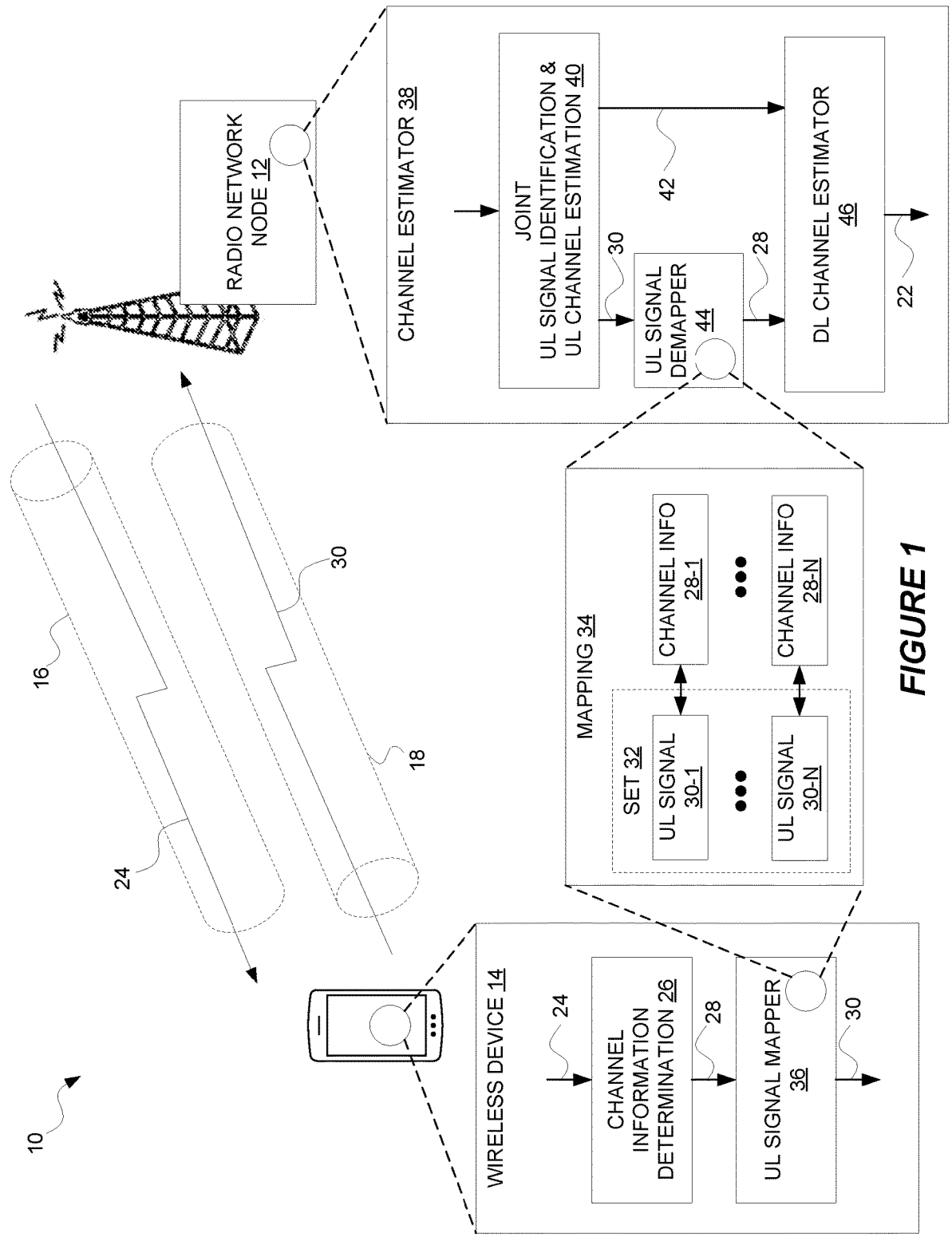
FIG. 1 is a block diagram of a wireless communication network according to some embodiments.

FIG. 1 shows a wireless communication network 10 according to some embodiments, e.g., a New Radio (NR) network, a Long Term Evolution (LTE) network, or a Wifi network. The wireless communication network 10 as depicted includes a radio network node 12 (e.g., a base station) and a wireless device 14 (e.g., a user equipment, UE). The radio network node 12 may be equipped with multiple antenna ports, e.g., for massive Multiple Input Multiple Output (MIMO). The radio network node 12 communicates wirelessly with the wireless device 14 over a downlink (DL) channel 16 and an uplink (UL) channel 18. The downlink channel 16 is the radio channel over which downlink transmissions propagate from the radio network node 12 to the wireless device 14, whereas the uplink channel 18 is the radio channel over which uplink transmissions propagate from the wireless device 14 to the radio network node 12.

In some embodiments, the downlink channel 16 is, or is assumed to be, reciprocal with the uplink channel 18. This may be the case, for example, where the downlink channel 16 and the uplink channel 18 are deployed on the same frequency resources but are separated in different time resources via time division duplexing (TDD). Regardless, the uplink-downlink reciprocity means that one or more properties of the downlink channel 16 may be inferred from one or more properties of the uplink channel 18, and vice versa. The reciprocity may be full in the sense that all properties of the downlink channel 16 may be inferred from the corresponding properties of the uplink channel 18, and vice versa. Or, the reciprocity may be partial in the sense that some, but not necessarily all, properties of the downlink channel 16 may be inferred from corresponding properties of the uplink channel 18, and vice versa. Regardless, the reciprocity means that the radio network node 12 may characterize the uplink channel 18, and, using reciprocity, apply one or more of the same channel characterizations to the downlink channel 16.

Indeed, in some embodiments, the radio network node 12 exploits this uplink-downlink reciprocity, in combination with implicit channel information feedback from the wireless device 14, in order to determine an estimate of the downlink channel 16. FIG. 1 in this regard shows that the radio network node 12 transmits a downlink reference signal 24 over the downlink channel 16. The downlink reference signal 24 may for instance be a Channel State Information Reference Signal (CSI-RS). Regardless, the wireless device 14 correspondingly receives this downlink reference signal 24 over the downlink channel 16. The wireless device 14 (via channel information determination 26) determines channel information 28 based on measurement of this downlink reference signal 24. In some embodiments, this channel information 28 is information that characterizes the downlink channel 16. In other embodiments, the channel information 28 is information that characterizes the uplink channel 18. In this case, channel information determination 26 may map an estimate of the downlink channel 16 onto an estimate of the uplink channel 18, e.g., so as to compensate for any hardware-incurred reciprocity errors between the downlink channel 16 and the uplink channel 18. Either way, the channel information 28 may be, or encode, a quantized channel estimate, e.g., in the form of a precoder or beam selected from a codebook of multiple possible precoders or beams.

In any event, after determining the channel information 28 from the downlink reference signal 24, the wireless device 14 thereafter conveys that channel information 28 to the radio network node 12. The wireless device 14 does so by transmitting an uplink signal 30 to the radio network node 12 over the uplink channel 18. Notably, though, the uplink signal 30 does not explicitly convey the channel information 28. In fact, in some embodiments, the uplink signal 30 is an uplink reference signal, such as a sounding reference signal (SRS), that explicitly conveys a reference signal sequence. Or, in other embodiments, the uplink signal 30 is a random access preamble, such as a Physical Random Access Channel (PRACH) preamble, that explicitly conveys a preamble sequence. Instead of explicitly conveying the channel information 28, then, the uplink signal 30 implicitly conveys the channel information 28. The uplink signal's conveyance of the channel information 28 is implicit in the sense that the uplink signal 30 does not itself expressly convey the channel information 28, but the channel information 28 is nonetheless implied from something else that the uplink signal 30 does expressly convey. Advantageously, this means that the uplink signal 30 conveys the channel information 28 without any additional cost in uplink resources above and beyond the uplink resources needed for what the uplink signal 30 expressly conveys.

FIG. 1 for example shows that, in some embodiments, a set 32 of candidate uplink signals 30-1 . . . 30-N is defined. In one or more embodiments, the set 32 is a finite set of pairwise orthogonal uplink signals. In other embodiments, the set 32 is a finite set of uplink signals that includes at least some uplink signals which are not pairwise orthogonal, but all pairs of uplink signals in the set have a correlation below a threshold, e.g., to satisfy detection requirements. Regardless, the different candidate uplink signals 30-1 . . . 30-N in the set 32 may explicitly convey different things, e.g., different signal sequences, different preambles, or, generally, different symbol values. Alternatively or additionally, the different candidate uplink signals 30-1 . . . 30-N in the set 32 may use different uplink signal resources, e.g., in the form of different signal sequences, different time resources, different frequency combs, different frequency patterns, and/or different cyclic shifts. Where the candidate uplink signals 30-1 . . . 30-N are sounding reference signals (SRSs) for instance, the candidate uplink signals 30-1 . . . 30-N may use different SRS resources, e.g., where each SRS resource may be a combination of a time resource, a frequency comb, a cyclic shift, a Zadoff-Chu sequence, a frequency domain resource, and/or a frequency domain hopping pattern.

Regardless of how the candidate uplink signals 30-1 . . . 30-N differ from one another in terms of what they explicitly convey or how they explicitly convey it, the different candidate uplink signals 30-1 . . . 30-N in the set 32 implicitly convey different respective channel information 28-1 . . . 28-N. Which candidate uplink signals 30-1 . . . 30-N convey which channel information 28-1 . . . 28-N may be defined, for example, according to a mapping 34 that maps the different candidate uplink signals 30-1 . . . 30-N in the set 32 to different respective channel information 28-1 . . . 28-N. In this case, the mapping 34 may be predefined at both the wireless device 14 and the radio network node 12, or may be signaled from the radio network node 12 to the wireless device 14. In any event, the wireless device 14 in these and other embodiments may select, from among the candidate uplink signals 30-1 . . . 30-N in the set 32, the uplink signal 30 to transmit, based on the determined channel information 28. That is, the wireless device 14 may select to transmit (as the uplink signal 30) whichever one of the candidate uplink signals 30-1 . . . 30-N implicitly conveys the channel information 28 that the wireless device 14 determined from the downlink reference signal 24. In embodiments that use the mapping 34 as shown, for instance, an uplink signal mapper 36 at the wireless device 14 may use the mapping 34 to map the determined channel information 28 to whichever one of the candidate uplink signals 30-1 . . . 30-N implicitly conveys that channel information 28. The wireless device 14 then implicitly conveys the channel information 28 simply by transmitting, as the uplink signal 30, the selected candidate uplink signal over the uplink channel 18. The implicit conveyance of channel information 28 may be attributable, therefore, to the wireless device 14 adapting which candidate uplink signal is transmitted, as a function of or otherwise in dependence on the channel information 28 to be conveyed, rather than fixedly transmitting the same uplink signal irrespective of the channel information 28.

The radio network node 12 correspondingly receives the uplink signal 30 from the wireless device 14 over the uplink channel 18. FIG. 1 shows that the radio network node 12 includes a channel estimator 38 configured to determine an estimate 40 of the downlink channel 16 based on the received uplink signal 30. The channel estimator 38 does so by exploiting the channel information 28 implicitly conveyed by the uplink signal 30, in combination with reciprocity between the uplink and downlink channels 16, 18.

More particularly, the channel estimator 38 performs joint uplink signal identification and uplink channel estimation 40 in order to jointly (i) identify which candidate uplink signal in the set 32 of candidate uplink signals 30-1 . . . 30-N is the received uplink signal 30; and (ii) determine an estimate 42 of the uplink channel 18 from the received uplink signal 30, e.g., based on measurement of the uplink signal 30. In identifying which candidate uplink signal is the received uplink signal 30, the channel estimator 38 identifies the uplink signal 30 as being a certain one of the candidate uplink signals in the set 32 of candidate uplink signals 30-1 . . . 30-N, e.g., by comparing the received uplink signal 30 to the different candidate uplink signals 30-1 . . . 30-N and identifying the candidate uplink signal that most closely matches the received uplink signal 30. That such identification is performed jointly with determining the estimate 42 of the uplink channel 18, though, means that the identification and estimate determination are performed in conjunction with one another, so that each one depends on the other. Accordingly, rather than determining the estimate 42 of the uplink channel 18 and then, based on that uplink channel estimate 42, separately identifying which candidate uplink signal is the uplink signal 30, the channel estimator 38 determines the estimate 42 of the uplink channel 18 in cooperation with and/or at the same time as identifying which candidate uplink signal is the uplink signal 30.

The channel estimator 38 may for example jointly identify which candidate uplink signal is the uplink signal 30 and determine the uplink channel estimate 42 such that the identified candidate uplink signal implicitly conveys channel information 28 that corresponds to the determined estimate 42 of the uplink channel 18. For instance, the channel estimator 38 in some embodiments determines, from among different possible combinations of candidate uplink signals and implicitly conveyed channel information, which combination most closely correlates with the received uplink signal 30 and the estimate of the uplink channel over which the uplink signal 30 was received. For example, the channel estimator 38 may perform matched filtering on the received uplink signal 30 using each candidate uplink signal, to not only determine how closely the candidate uplink signal correlates with the received uplink signal 30 but also to determine how closely the channel information implicitly conveyed by that candidate uplink signal correlates with the estimate of the uplink channel over which the uplink signal 30 was received. Moreover, in some embodiments, the channel estimator 38 may advantageously exploit this approach to limit processing complexity, e.g., to only correlate with uplink signals received in beam directions with high energy and/or only evaluate spatially for uplink signals with high energy.

After identifying which candidate uplink signal is the received uplink signal 30, the channel estimator 38 determines the channel information 28 implicitly conveyed by the identified candidate uplink signal. The channel estimator 38 as shown, for example, includes an uplink signal demapper 44 that maps the identified candidate uplink signal to channel information 28, e.g., according to the mapping 34. Notably, then, the channel estimator 38 exploits the same received uplink signal 30 both for determining the estimate 42 of the uplink channel 18 and for recovering the implicitly conveyed channel information 28.

The channel estimator 38 as shown also includes a downlink channel estimator 46 that determines the estimate 22 of the downlink channel 16 based on the determined channel information 28 and the determined estimate 42 of the uplink channel 18, e.g., assuming reciprocity between the downlink channel 16 and the uplink channel 18. Note here that the implicitly conveyed channel information 28 contributes additional information to estimation of the downlink channel 16 than would have otherwise been available from an uplink channel estimate alone. Moreover, with the channel information 28 having been determined by the wireless device 14 from the downlink reference signal 24, the channel information 28 itself may accurately characterize the downlink channel 16 or the uplink channel 18, even if the uplink signal quality is low, e.g., due to the transmit power of the wireless device 12 being lower than the transmit power of the radio network node 14. The implicitly conveyed channel information 28 therefore advantageously increases the accuracy of the downlink channel estimate 22, and does so without requiring additional uplink resources or transmit power to feed back that information 28. Generally, then, some embodiments utilize the channel information 28 at the wireless device 14 to redesign the uplink signal transmission for improving the downlink channel estimate 22 at the radio network node 12 and/or for improving system capacity.

Based on such an estimate 22 of the downlink channel 16, the radio network node 12 in some embodiments may precode a downlink transmission (not shown) to the wireless device 14, e.g., where the downlink transmission may include user data for the wireless device 14. That is, radio network node 12 precodes a downlink transmission to the wireless device 14 based on the estimate 22 of the downlink channel 16 and then transmits the precoded downlink transmission to the wireless device 14 over the downlink channel 16. In some embodiments, the radio network node 12 transmits, to the wireless device 14, control information indicating that the precoded downlink transmission is quasi-co-located with the uplink signal 30. The control information may for instance comprise Downlink Control Information, DCI, on a Physical Downlink Control Channel, PDCCH. Regardless, based on this control information, the wireless device 14 may assume that the channel characteristics of the precoded downlink transmission are related to the implicitly conveyed channel information.

In some embodiments, the precoded downlink transmission may include a downlink reference signal. In such a case, the radio network node 12 may even select the downlink reference signal based on the identified candidate uplink signal. The radio network node 12 may do so for example where multiple wireless devices contend in the uplink. The radio network node 12 in this regard may configure a set of virtual cell identities and, depending on the identity of the uplink signal 30, select one of the virtual identities to use for deriving the downlink reference signal. This results in different downlink reference signals for different uplink signals.

Note that, although FIG. 1 focused on a single wireless device 14, the wireless device 14 may be just one of multiple wireless devices served by the radio network node 12, e.g., in a massive Multiple Input Multiple Output (MIMO) scenario. In this case, the downlink transmission to the wireless device 14 may be one of multiple downlink transmissions that are precoded based on respective estimates of the downlink channels over which they will propagate. The radio network node 12 in some embodiments determines each of those downlink channel estimates as described above, by exploiting uplink signals received from respective ones of the wireless devices. Doing so may enable the radio network node 12 to advantageously precode the downlink transmissions with improved multi-user interference cancellation, even for wireless devices with low signal quality, such as those devices at the cell edge.

Consider a simple example, e.g., where the wireless communication network 10 is an NR network or an LTE network. In this example, the downlink reference signal 24 is a CSI-RS and the uplink signal 30 is an SRS, selected from among multiple different candidate SRSs that use different SRS resources assigned to the wireless device 14. The wireless device 14 measures the CSI-RS to determine the channel information 28 in the form of a selected precoder or beam. The wireless device 14 then selects which SRS resource to use (and therefore which SRS to transmit) depending on the selected precoder or beam. For example where the channel information 28 represents a selected beam, in a 120 degree sector, 4 different SRS resources may be assigned to the wireless device 14. If the wireless device 14 selects a beam in [0,30) degrees, the wireless device 14 selects to use SRS resource 1. If the wireless device 14 selects a beam in [30,60) degrees, the wireless device 14 selects to use SRS resource 2. If the wireless device 14 selects a beam in [60,90) degrees, the wireless device 14 selects to use SRS resource 3. And if the wireless device 14 selects a beam in [90,120) degrees, the wireless device 14 selects to use SRS resource 4. When the radio network node 12 performs joint signal identification and channel estimation, then, it may restrict itself to or prioritize channel estimates that lie in the subspace implicitly indicated by the used SRS resource, e.g., giving a 6 dB processing gain advantage (the sequence detection gives low errors).

In another example, the uplink signal 30 is a random access preamble, a scheduling request, or any other type of signal usable for resolving contention between multiple wireless devices. In this case, different random access preambles, scheduling requests, or other contention-resolving signals may be mapped to different precoders or beams. The wireless device 14 then selects which random access preamble, scheduling request, or other contention-resolving signal to transmit depending on the selected precoder or beam. For example where the channel information 28 represents a selected beam, in a 120 degree sector, 4 different random access preambles may be assigned to the wireless device 14. If the wireless device 14 selects a beam in [0,30) degrees, the wireless device 14 selects to transmit random access preamble 1. If the wireless device 14 selects a beam in [30,60) degrees, the wireless device 14 selects to transmit random access preamble 2. If the wireless device 14 selects a beam in [60,90) degrees, the wireless device 14 selects to transmit random access preamble 3. And if the wireless device 14 selects a beam in [90,120) degrees, the wireless device 14 selects to transmit random access preamble 4. When the radio network node 12 performs joint signal identification and channel estimation, then, it may restrict itself to or prioritize channel estimates that lie in the subspace implicitly indicated by the received random access preamble e.g., giving a 6 dB processing gain advantage (the sequence detection gives low errors). This may in turn improve random access or other procedures for resolving multi-device contention.

Consider now additional details illustrated in an example where a single single-antenna wireless device 14 is served by a radio network node 12 with N antennas. In this example, uplink-downlink reciprocity holds, and each of the uplink channel 18 and the downlink channel 16 is represented by the N-dimensional vector g. Further, consider a grid-of-beams world; that is, g is unknown at the radio network node 12 but is one of the B vectors in the set $\mathcal{G} = \{g_1, \ldots, g_b, \ldots, g_B\}$. These vectors are mutually non-orthogonal in general but they have the same, known, norm $\|g\|^2=N\beta$. The goal of the radio network node 12 is to determine the estimate 22 of the downlink channel 16 based on the uplink signal 30 (e.g., an uplink reference signal) transmitted over the uplink channel 18. For the sake of the example, assume that the wireless device 14 has perfectly detected the downlink channel 16 from the set of beams g with the help of the downlink reference signal 24. On the uplink, for the purpose of channel estimation at the radio network node 12, the uplink signal 30 transmitted by the wireless device is an uplink signal s, and the radio network node 12 receives $$Y=\sqrt{\rho}gs^T+W,$$

where W is noise with $\mathcal{CN}(0,1)$ elements. This uplink signal s has unit norm, $\|s\|^2=1$, which makes the parameter $\rho$ have the interpretation of signal-to-noise ratio (SNR) after coherent integration over the signal. Assume that the uplink signal s conveys a sequence of symbols (e.g., a reference signal sequence), where the sequence is $\tau$ symbols long, which implies that s is a vector of length $\tau$.

If the uplink signal s were fixed, so as to be constant regardless of which beam the wireless device detected, the task of the radio network node would be to detect the most likely beam, which translates into $$\min_{g \in \mathcal{G}} \|Y - \sqrt{\rho}gs^T\|$$

or equivalently $$\max_{g \in \mathcal{G}} \text{Re}\{s^T Y g\}.$$

If the true beam is g, then an error is made in favor of another candidate beam, $g_{b'}$ if $\text{Re}\{s^T Y g_{b'}\} > \text{Re}\{s^T Y g_b\}$. This can also be expressed as $$\text{Re}\{\sqrt{\rho}g_b^H g_{b'} + s^T W g_{b'}\} > \text{Re}\{\sqrt{\rho}N\beta + s^T W g_b\}.$$

In this case, for a fixed set of beams, only the SNR affects the detection performance.

By contrast, the wireless device 14 according to embodiments herein selects the uplink signal s as a function of g. According to some embodiments, for example, the wireless device 14 and the radio network node 12 have agreed upon a mapping 34 of the beams to uplink signals, $s=M(g)$, such that $s_b=M(g_b)$, for all b=1, ..., B. Hence, the wireless device 14 will transmit an uplink signal s based on the channel estimate 28 that it has obtained. The detection task at the radio network node 12 is to jointly detect the uplink signal s and the channel estimate g:

$$\min_{g \in \mathcal{G}} \|Y - \sqrt{\rho}gM(g)^T\|.$$

If the true channel-signal pair is $(g_b, M(g_b))=(g_b, s_b)$, then an error is made in favor of another candidate channel-signal pair, $(g_{b'}, s_{b'})$ if $$\text{Re}\{\sqrt{\rho}s_{b'}^T s_b^* g_b^H g_{b'} + s_{b'}^T W^H g_{b'}\} > \text{Re}\{\sqrt{\rho}N\beta + s_b^T W^H g_b\}.$$

Here, two factors affect the detection performance. First, having a higher SNR will improve the performance. Second, importantly, the product $\text{Re}\{s_{b'}^T s_b^* g_b^H g_{b'}\}$ will affect the performance, demonstrating that the choice of the signal mapping M(•) affects performance. For best performance, this metric should be small for all pairs of b and b', b≠b'. In general, the metric is non-zero. However, it is zero in the following two special cases:

a. When the beams are all mutually orthogonal: $g_b^H g_{b'}=0$, b=1, ..., B, b'=1, ..., B, b≠b', which is generally not the case.

b. When the uplink signals are all mutually orthogonal $s_b^H s_{b'}=0$, b=1, ..., B, b'=1, ..., B, b≠b'. Generally, for these uplink signals to be mutually orthogonal, the number of symbols in the uplink signals need to be equal to (or larger than) the number of beams, $\tau=B$, which is not desirable as the overhead for uplink signals increases while the total uplink resources are limited.

Some embodiments design the mapping M(•) such that given a sequence length $\tau$ and the set of beams $\mathcal{G}$, the inner product $s_b^H s_{b'}$ is small when $g_b^H g_{b'}$ is large. In one embodiment, the optimal mapping is obtained in a max-min sense, mathematically:

$$\min_{M:s_b=M(g_b)} \max_{\substack{b,b' \\ b \neq b'}} \text{Re}\{s_{b'}^T s_b^* g_b^H g_{b'}\} = \min_S \zeta(S, G), \text{ where}$$

$$S = [s_1, \ldots, s_B] \text{ and } G = [g_1, \ldots, g_B], \text{ and}$$

$$\zeta(S, G) = \max_{\substack{b,b' \\ b \neq b'}} \text{Re}\{s_{b'}^T s_b^* g_b^H g_{b'}\}$$

For illustration, say that the beams between the N antenna radio network node 12 and the single-antenna wireless device 14 are (uniform linear array with $\lambda/2$-spacing)

$$g_b = \sqrt{\beta}\left[1, \ldots, e^{2\pi j(n-1)\frac{b-1}{B}}, \ldots, e^{2\pi j(N-1)\frac{b-1}{B}}\right]^T, \quad (1)$$

for all b=1, ..., B. The inner product of two beams is $$g_b^H g_{b'} = \beta \sum_{n=1}^N e^{2\pi j(n-1)\frac{b'-b}{B}}.$$

If $$v = \frac{B}{N}$$

is an integer, then every vth beam is orthogonal, $$g_b^H g_{b+v} = \beta \sum_{n=1}^N e^{2\pi j \frac{(n-1)}{N}} = 0,$$

and hence, v orthogonal sequences are sufficient to make the desired metric 0, $\zeta(S, G)=0$. Accordingly, in some embodiments, the number of candidate uplink signals in the set from which the uplink signal is selected may be less than or equal to $$v = \frac{B}{N},$$

where B is the number of beams over which the radio network node 12 is configured to transmit and where N is the number of transmit antennas at the radio network node 12.

According to some embodiments, then, the wireless device 14 may receive and measure the downlink reference signal 24 from the radio network node 12, in order to obtain channel information 28 in the form of an estimate $\hat{g}$ of the downlink channel g. The wireless device 14 may then select, based on this estimate $\hat{g}$, an uplink signal s to transmit. The wireless device 14 may for example map the estimate $\hat{g}$ onto an uplink signal s according to the mapping $M(\hat{g})$ between different possible channel estimates and different respective uplink signals. The wireless device 14 may have obtained this mapping $M(\hat{g})$ from the radio network node 12, or the mapping $M(\hat{g})$ may be predefined. In some embodiments, by way of the mapping $M(\hat{g})$, the uplink signal s encodes the estimate $\hat{g}$ in the form of an index, e.g., a precoding matrix indicator (PMI). Regardless, the wireless device 14 transmits the selected uplink signal s to the radio network node 12 over the uplink channel 18.

The radio network node 12 correspondingly receives the uplink signal s over the uplink channel 18. The uplink signal s depends on the downlink channel g in two ways. First, the uplink signal s encodes information about the downlink channel g, e.g., according to the mapping $M(\hat{g})$. Second, the uplink signal s has propagated over an uplink channel 18 that is, or is assumed to be, reciprocal with the downlink channel g. Viewing the uplink signal s as a "pilot", albeit a priori unknown to the radio network node 12, the spatial characteristics of the received per-antenna signals themselves contain information about the downlink channel g. Such spatial characteristics may include for example phase shifts between the per-antenna signals. Accordingly, the radio network node 12 determines its estimate of the downlink channel g using an algorithm that simultaneously exploits both of these dependencies. The radio network node 12 may for example jointly detect the uplink signal s and estimate the downlink channel g from the uplink signal s, using an algorithm that exploits a combination of uplink-downlink reciprocity and knowledge of the mapping $M(\hat{g})$. In this way, the wireless device 14 herein may assist the radio network node 12 with downlink channel estimation, by exploiting uplink-downlink reciprocity combined with channel information feedback. Such may improve the uplink and/or downlink channel estimation quality, enable the use of reciprocity-based channel estimation also in cases where the uplink SNR is too low for conventional methods, and/or enable improved multiplexing of uplink reference signals for reciprocity, e.g., for LTE or NR SRS channel.

Figure 2:
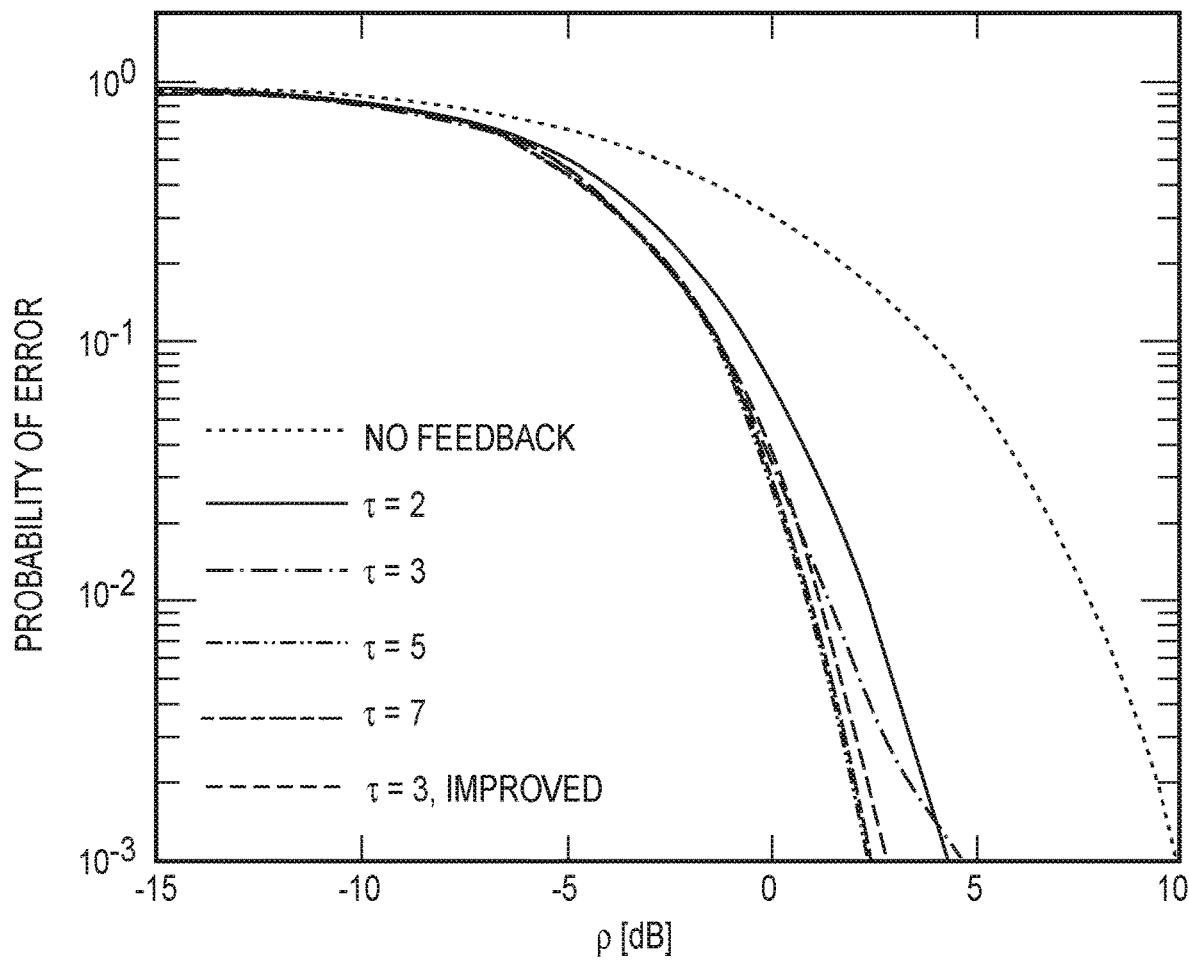
FIG. 2 is a graph depicting the probability of incorrectly detecting a user beam according to some embodiments with orthogonal uplink signals and according to other embodiments with optimized, non-orthogonal uplink signals.

FIG. 2 shows the probability of incorrectly detecting a user beam, according to the results of a simulation where the beams are generated according to equation (1). The number of beams B is 70 and the number of radio network node antennas N is 10, making v=7. In the simulation, there are $\tau$ orthogonal uplink signals which are assigned to every $\tau$th beam. To guarantee that the metric is 0, it is sufficient to use $\tau=7$. The "No feedback" case is when the uplink signal s is fixed, which serves as a baseline. The cases "$\tau=2$", "$\tau=3$", "$\tau=5$", "$\tau=7$" consider the embodiments described above where the $\tau$ uplink signals are mutually orthogonal. These cases outperform the baseline and larger $\tau$ leads to smaller probability of error. The "$\tau=3$, improved" case is when the uplink signals are non-orthogonal but optimized in a way that tries to minimize the metric $\zeta$. The result is that the performance comes close to the case of $\tau=7$ but with less than half (3/7) of the uplink resources, when the uplink signal mapping is chosen appropriately.

Figure 3:
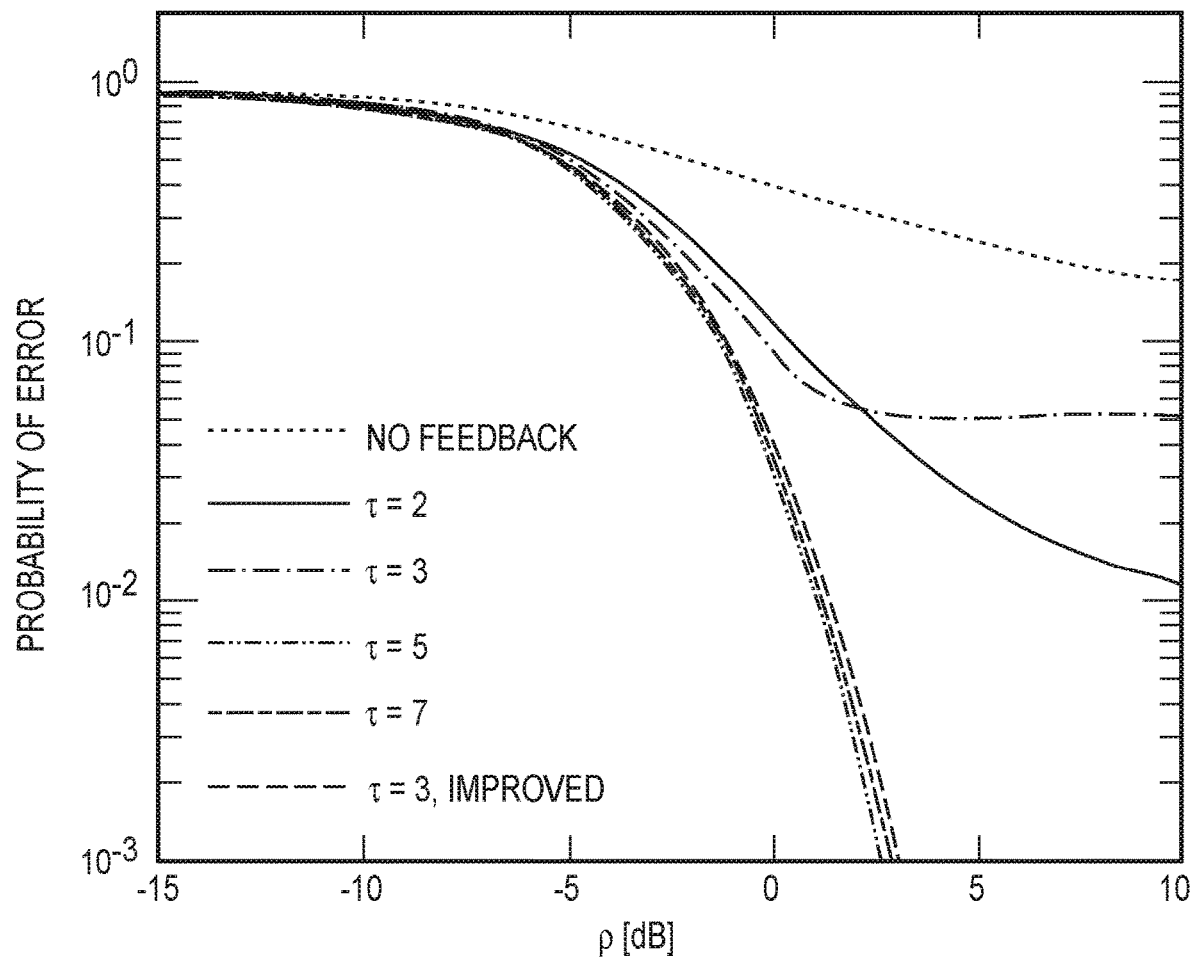
FIG. 3 is a graph depicting the probability of incorrectly detecting a quantized user beam according to some embodiments.
Figure 4:
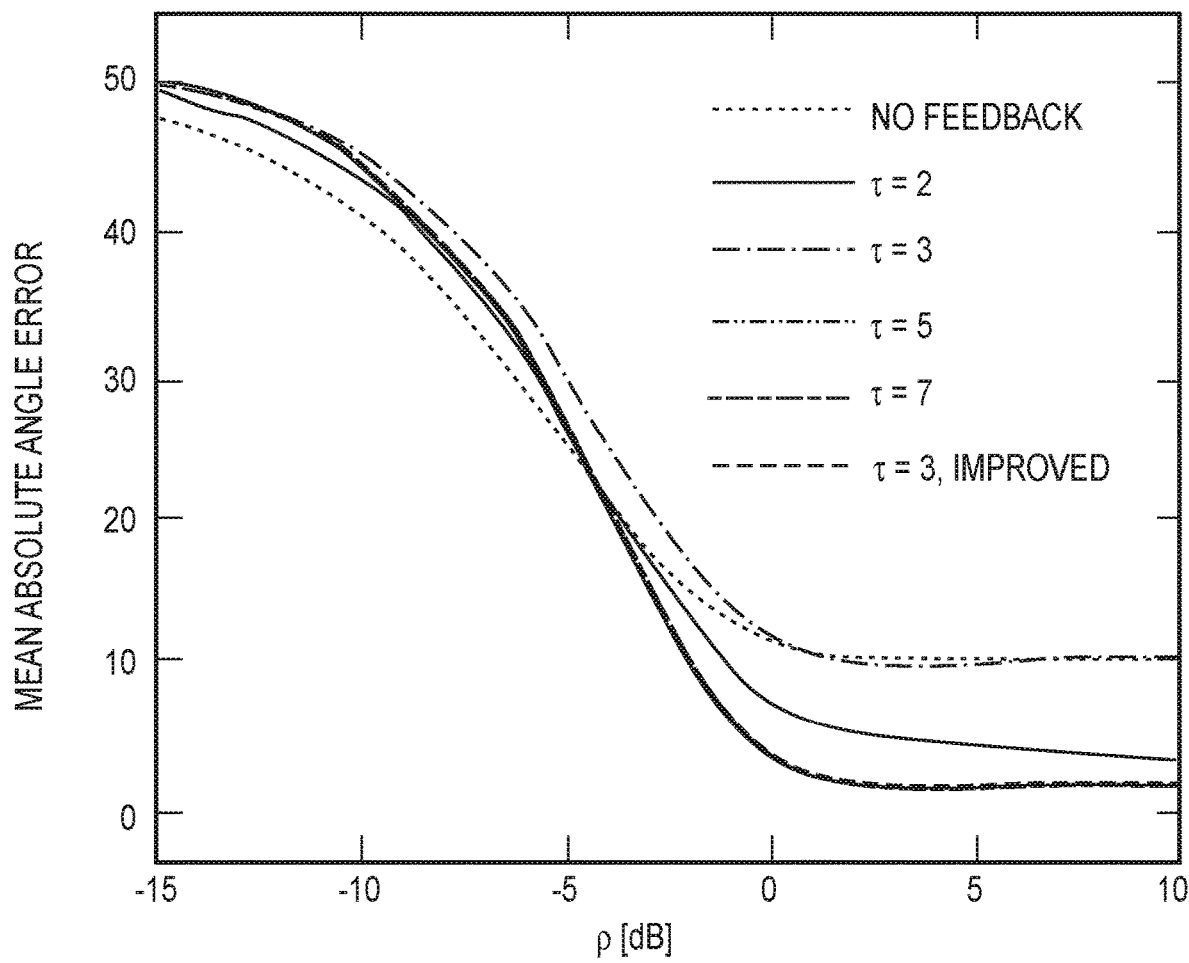
FIG. 4 is a graph depicting the mean absolute angle error between the detected and the unquantized beam according to some embodiments.

FIGS. 3 and 4 show the results of a more realistic simulation, where the wireless device 14 is not located in the "grid-of-beams world" but instead located in line-of-sight to the radio network node 12 with an arbitrary angle-of-arrival. The considered methods are the same as in FIG. 2. The radio network node 12 is equipped with a horizontal uniform linear array. The wireless device 14 "quantizes" its channel to the closest (in angle) beam from the set g and maps it to the corresponding uplink signal 30, e.g., an uplink reference signal. The wireless device 14 sends the uplink signal 30 over the uplink channel 18 (which again, is line-of-sight with an arbitrary angle). The radio network node 12 then detects which of the quantized beams is most likely.

Observe again that the performance of the "improved" signal mapping is very good even though the wireless device 14 quantizes its channel estimates by projecting onto a grid. FIG. 3 shows that the probability of error is smaller than the baseline, and comparable to the case of $\tau=7$ (which uses more than twice the amount of uplink resources) for a wide range of SNR values. FIG. 4 shows the angle-of-arrival estimation error (rather than the probability of beam misdetection), and the conclusions are similar to in FIG. 3.

Figure 5:
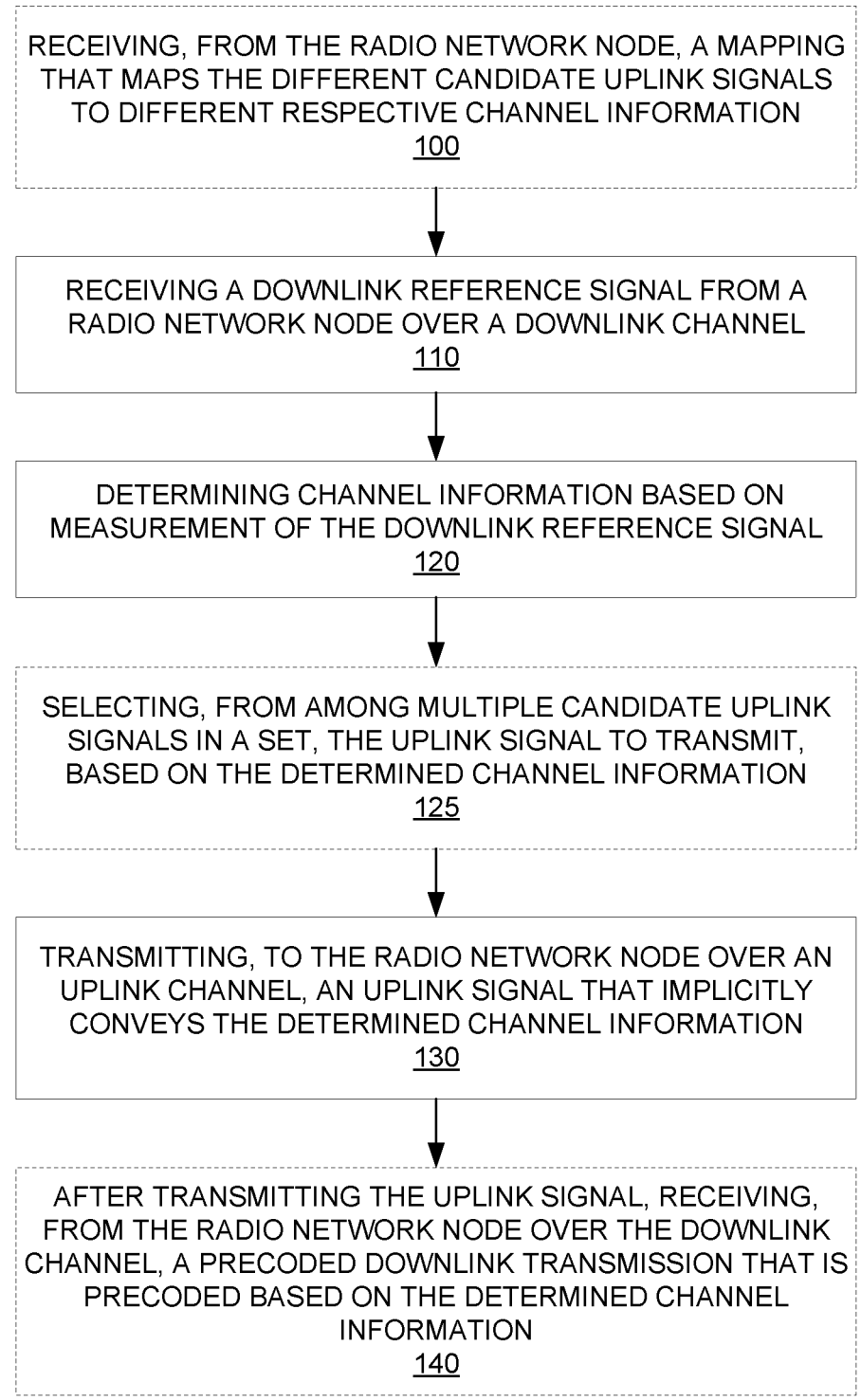
FIG. 5 is a logic flow diagram of a method performed by a wireless device according to some embodiments.

In view of the above modifications and variations, FIG. 5 shows a method performed by a wireless device 14 according to some embodiments. The method includes receiving a downlink reference signal 24 from a radio network 12 node over a downlink channel 16 (Block 110). The method further includes determining channel information 28 based on measurement of the downlink reference signal 24 (Block 120). The method may then include transmitting, to the radio network node 12 over an uplink channel 18, an uplink signal 30 (e.g., an uplink reference signal) that implicitly conveys the determined channel information 28 (Block 130).

In some embodiments, the uplink signal 30 is a sounding reference signal.

In other embodiments, the uplink signal 30 is a random access preamble.

In some embodiments, the channel information 28 is, or encodes, a quantized estimate of the uplink channel 18 or the downlink channel 16.

In some embodiments, the downlink reference signal 24 is received, and the uplink signal 30 is transmitted, using time division duplexing (TDD). Alternatively or additionally, the downlink channel 16 is, or is assumed to be, fully reciprocal with the uplink channel 18.

In some embodiments, the method also comprises selecting, from among multiple candidate uplink signals 30-1 . . . 30-N (e.g., multiple candidate uplink reference signals) in a set 32, the uplink signal 30 to transmit, based on the determined channel information 28 (Block 125). In this case, the different candidate uplink signals 30-1 . . . 30-N in the set 32 may implicitly convey different respective channel information. In one embodiment, the set 32 is a finite set of pairwise orthogonal uplink signals. In another embodiment, by contrast, the set 32 is a finite set of uplink signals that includes at least some uplink signals which are not pairwise orthogonal but all pairs of uplink signals in the set have a correlation below a threshold. Alternatively or additionally, the different candidate uplink signals 30-1 . . . 30-N in the set 32 may use different uplink signal resources, where the different uplink signal resources include different signal sequences, different time resources, different frequency combs, different frequency patterns, and/or different cyclic shifts. Alternatively or additionally, in some embodiments, the different candidate uplink signals 30-1 . . . 30-N are candidate uplink reference signals or are different random access preambles.

Regardless, in one or more embodiments, the method alternatively or additionally includes receiving, from the radio network node 12, a mapping 34 that maps the different candidate uplink signals 30-1 . . . 30-N to different respective channel information (Block 100). In this case, selecting the uplink signal 30 to transmit may be based on the mapping.

In some embodiments, the number of candidate uplink signals in the set 32 is less than or equal to $$v = \frac{B}{N},$$

where B is a number of beams over which the radio network node 12 is configured to transmit and where N is a number of transmit antennas at the radio network node 12.

In some embodiments, the method further comprises, after transmitting the uplink signal 30, receiving, from the radio network node 12 over the downlink channel 16, a precoded downlink transmission that is precoded based on the determined channel information 28 (Block 140). In one such embodiment, the precoded downlink transmission includes a downlink reference signal, where the downlink reference signal is based on the transmitted uplink signal 30.

FIG. 6 shows a method performed by the radio network node 12 according to some embodiments. The method includes transmitting a downlink reference signal 24 over a downlink channel 16 (Block 210). The method also includes receiving an uplink signal 30 from a wireless device 14 over an uplink channel 18 (Block 220). The method further includes jointly (i) identifying which candidate uplink signal in a set 32 of candidate uplink signals 30-1 . . . 30-N is the received uplink signal 30; and (ii) determining an estimate 42 of the uplink channel 18 from the received uplink signal 30 (Block 230). The method may further include determining channel information 28 implicitly conveyed by the identified candidate uplink signal (Block 240), where different candidate uplink signals 30-1 . . . 30-N in the set 32 implicitly convey different channel information. The method may also include determining an estimate 22 of the downlink channel 16 based on the determined channel information 28 and the determined estimate 42 of the uplink channel 18 (Block 250).

In some embodiments, the method further includes transmitting, to the wireless device 14, a mapping 34 that maps the different candidate uplink signals 30-1 . . . 30-N in the set 32 to different respective channel information (Block 200). In this case, determining the channel information 28 implicitly conveyed by the identified candidate uplink signal may comprise mapping the identified candidate uplink signal to channel information according to the mapping 34.

In some embodiments, jointly identifying and determining may be performed such that the identified candidate uplink signal implicitly conveys channel information that corresponds to the determined estimate 42 of the uplink channel 18.

In one embodiment, the set 32 is a finite set of pairwise orthogonal uplink signals. In another embodiment, by contrast, the set 32 is a finite set of uplink signals that includes at least some uplink signals which are not pairwise orthogonal but all pairs of uplink signals in the set have a correlation below a threshold. Alternatively or additionally, the different candidate uplink signals 30-1 . . . 30-N in the set 32 may use different uplink signal resources, where the different uplink signal resources include different signal sequences, different time resources, different frequency combs, different frequency patterns, and/or different cyclic shifts. Alternatively or additionally, in some embodiments, the different candidate uplink signals 30-1 . . . 30-N are candidate uplink reference signals or are different random access preambles.

In some embodiments, the uplink signal 30 is a sounding reference signal.

In other embodiments, the uplink signal 30 is a random access preamble.

In some embodiments, the channel information 28 is, or encodes, a quantized estimate of the uplink channel 18 or the downlink channel 16.

In some embodiments, the downlink reference signal 24 is received, and the uplink signal is transmitted, using time division duplexing (TDD). Alternatively or additionally, the downlink channel 16 is, or is assumed to be, fully reciprocal with the uplink channel 18.

Regardless, in one or more embodiments, the method alternatively or additionally includes, based on the determined estimate 22 of the downlink channel 16, precoding a downlink transmission to the wireless device 14 (Block 260), and transmitting the precoded downlink transmission to the wireless device 14 over the downlink channel 16 (Block 270). In one such embodiment, the precoded downlink transmission includes a downlink reference signal, in which case the method may further comprise selecting the downlink reference signal 24 based on the identified candidate uplink signal.

In some embodiments, the number of candidate uplink signals 30-1 . . . 30-N in the set 32 is less than or equal to $$v = \frac{B}{N},$$

where B is a number of beams over which the radio network node 12 is configured to transmit and where N is a number of transmit antennas at the radio network node 12.

Embodiments herein also include corresponding apparatuses. Embodiments herein for instance include a wireless device 14 configured to perform any of the steps of any of the embodiments described above for the wireless device 14.

Embodiments also include a wireless device 14 comprising processing circuitry and power supply circuitry. The processing circuitry is configured to perform any of the steps of any of the embodiments described above for the wireless device 14. The power supply circuitry is configured to supply power to the wireless device 14.

Embodiments further include a wireless device 14 comprising processing circuitry. The processing circuitry is configured to perform any of the steps of any of the embodiments described above for the wireless device 14. In some embodiments, the wireless device 14 further comprises communication circuitry.

Embodiments further include a wireless device 14 comprising processing circuitry and memory. The memory contains instructions executable by the processing circuitry whereby the wireless device 14 is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 14. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12 configured to perform any of the steps of any of the embodiments described above for the radio network node 12.

Embodiments also include a radio network node 12 comprising processing circuitry and power supply circuitry. The processing circuitry is configured to perform any of the steps of any of the embodiments described above for the radio network node 12. The power supply circuitry is configured to supply power to the radio network node 12.

Embodiments further include a radio network node 12 comprising processing circuitry. The processing circuitry is configured to perform any of the steps of any of the embodiments described above for the radio network node 12. In some embodiments, the radio network node 12 further comprises communication circuitry.

Embodiments further include a radio network node 12 comprising processing circuitry and memory. The memory contains instructions executable by the processing circuitry whereby the radio network node 12 is configured to perform any of the steps of any of the embodiments described above for the radio network node 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
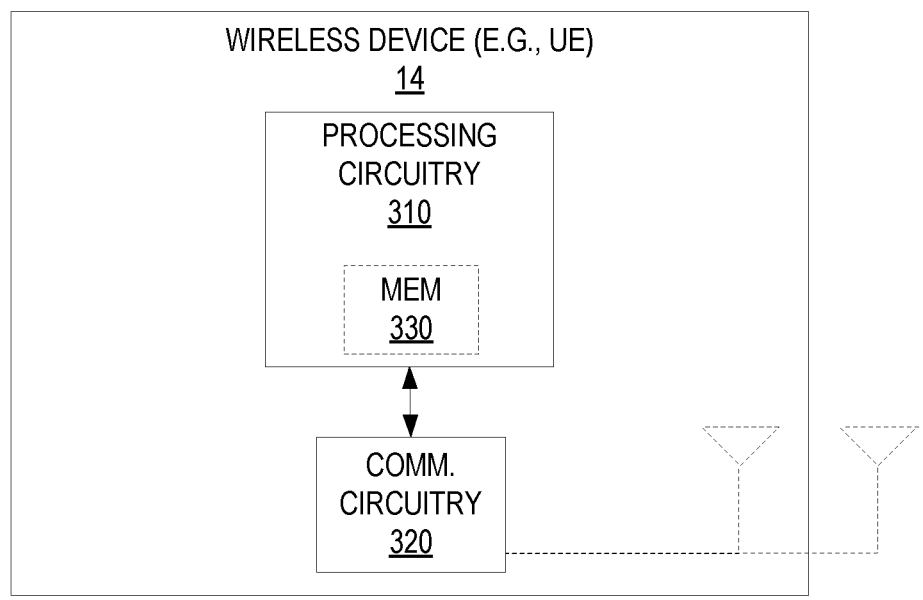
FIG. 7 is a block diagram of a wireless device according to some embodiments.

FIG. 7 for example illustrates a wireless device 14 as implemented in accordance with one or more embodiments. As shown, the wireless device 14 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the wireless device 14. The processing circuitry 310 is configured to perform processing described above, e.g., in FIG. 5, such as by executing instructions stored in memory 330. The processing circuitry 310 in this regard may implement certain functional means, units, or modules.

Figure 8:
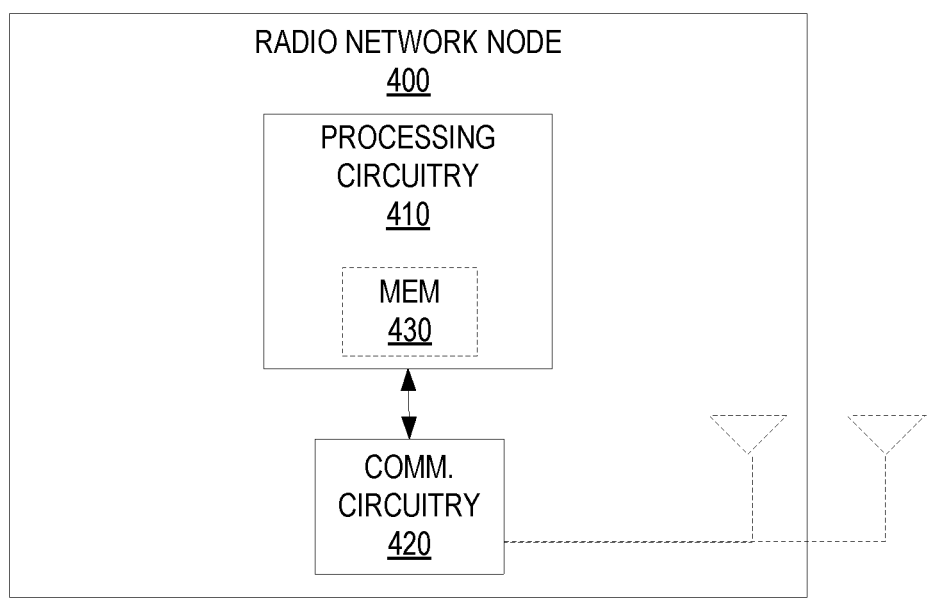
FIG. 8 is a block diagram of a radio network node according to some embodiments.

FIG. 8 illustrates a radio network node 12 as implemented in accordance with one or more embodiments. As shown, the radio network node 12 includes processing circuitry 410 and communication circuitry 420. The communication circuitry 420 is configured to transmit and/or receive information to and/or from one or more other nodes, e.g., via any communication technology. The processing circuitry 410 is configured to perform processing described above, e.g., in FIG. 6, such as by executing instructions stored in memory 430. The processing circuitry 410 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 9:
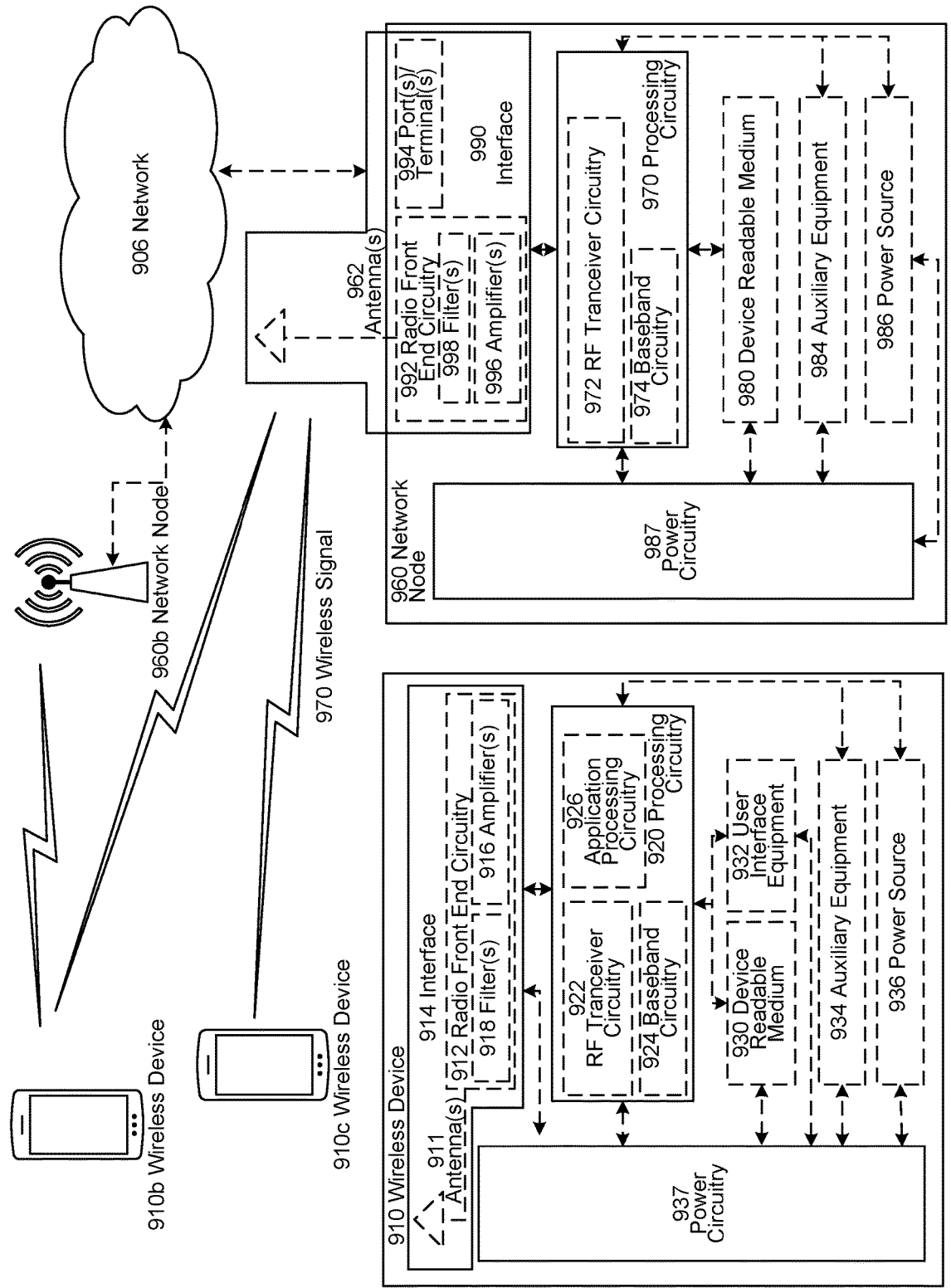
FIG. 9 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless device 910 may be one example of the wireless device 14 herein, and the network node 960 may be one example of the radio network node 12 herein. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
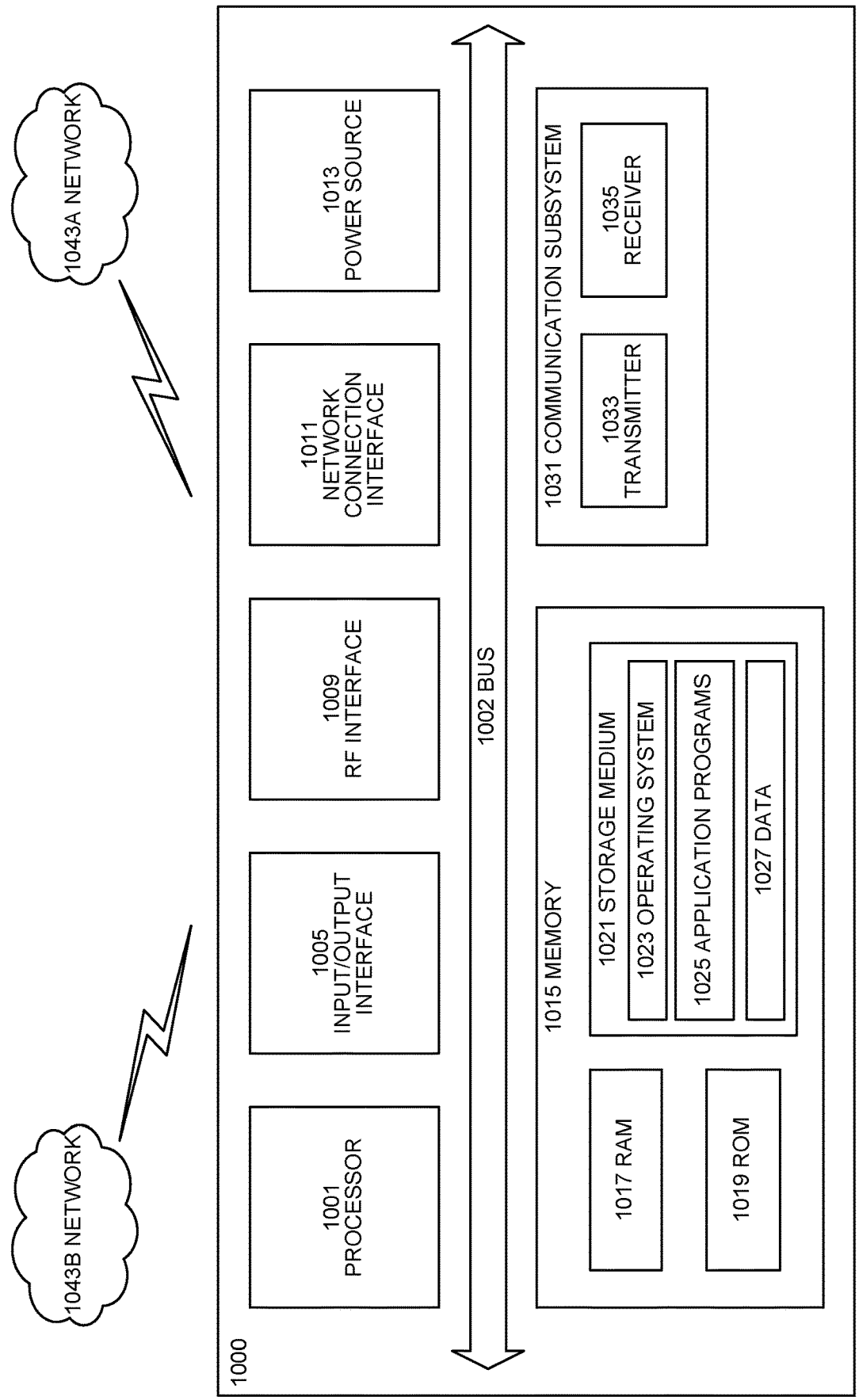
FIG. 10 is a block diagram of a user equipment according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
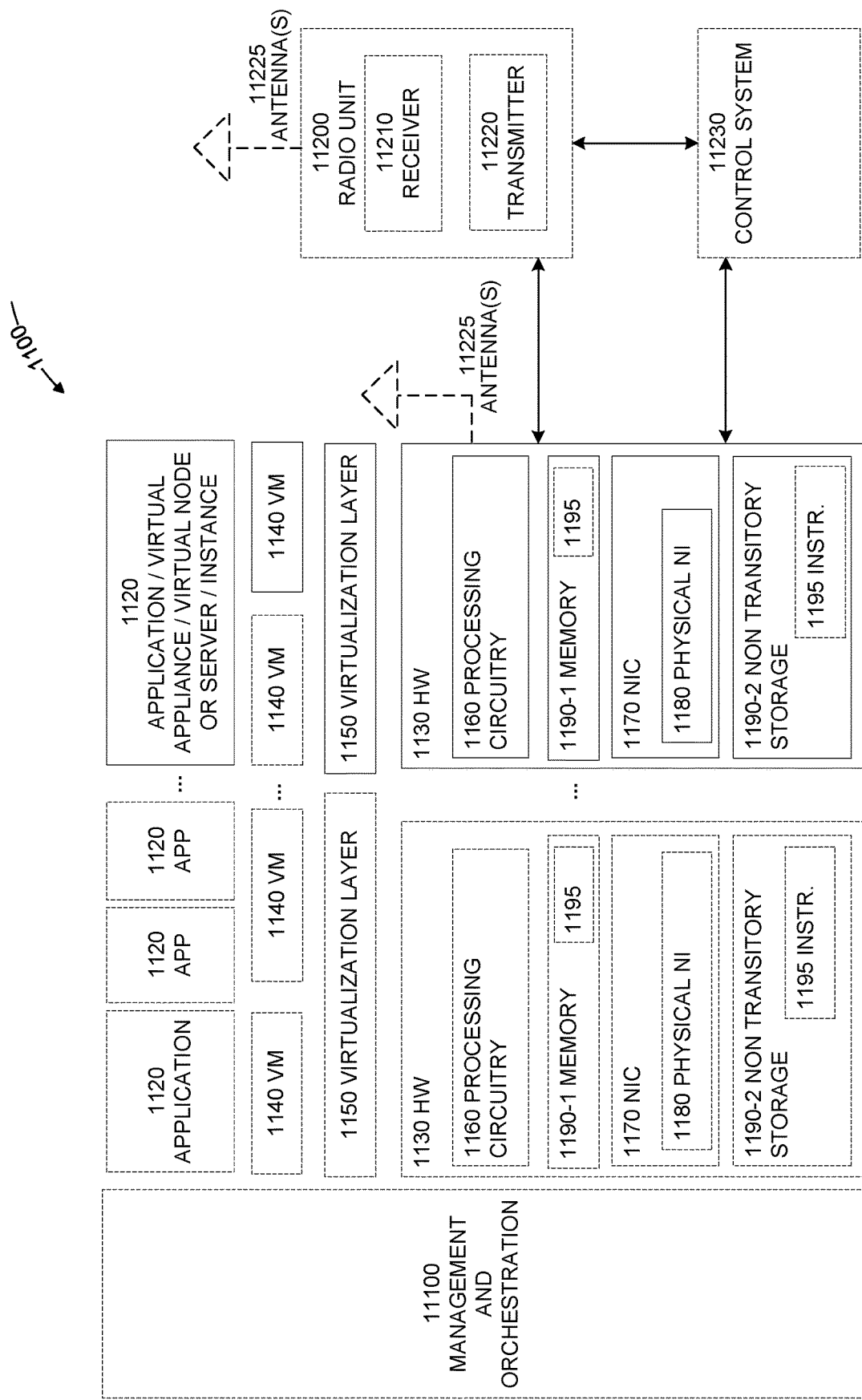
FIG. 11 is a block diagram of a virtualization environment according to some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
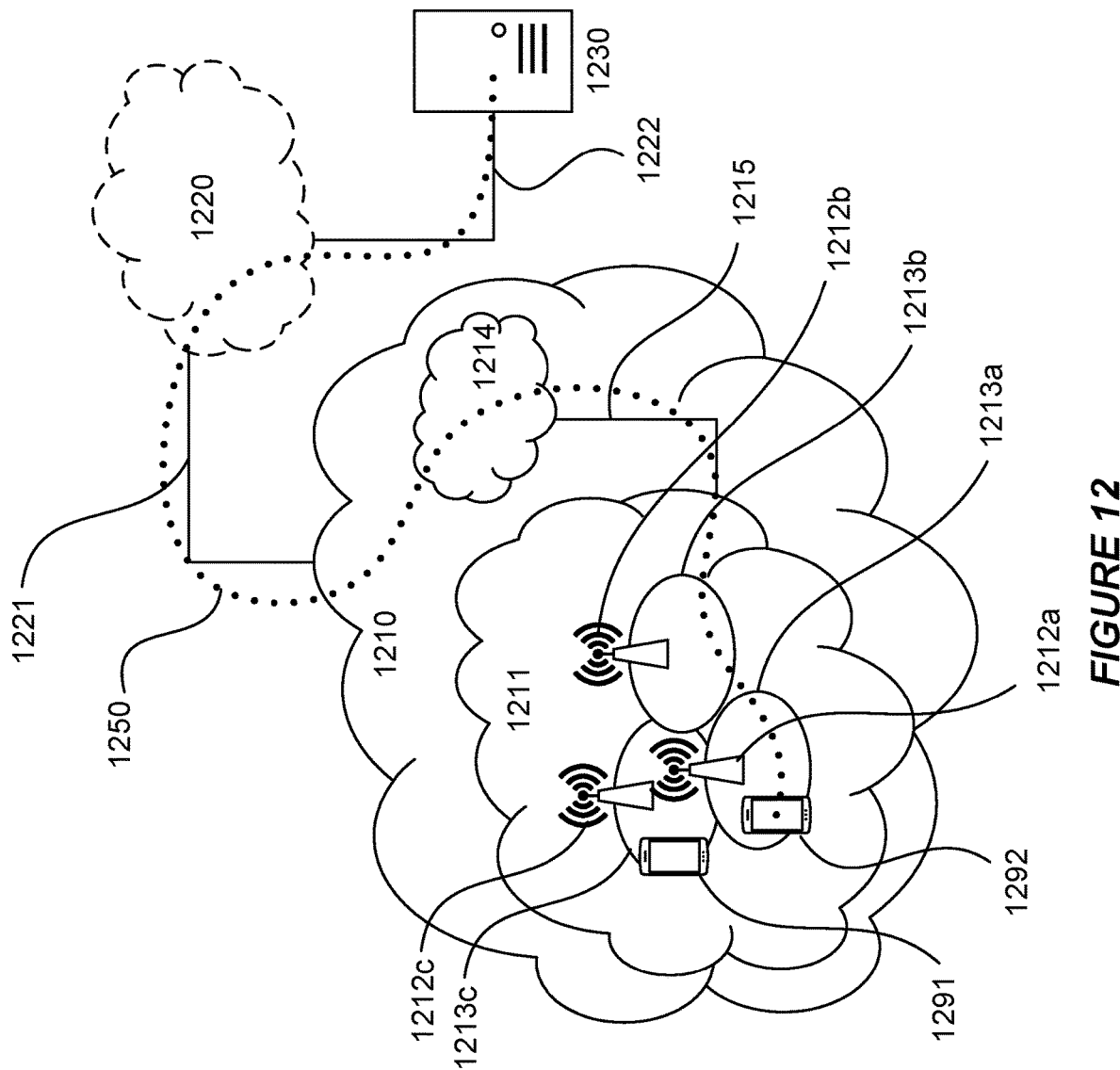
FIG. 12 is a block diagram of a communication network with a host computer according to some embodiments.

FIG. 12 illustrates a telecommunication network connected via an intermediate network to a host computer in accordance with some embodiments. In particular, with reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
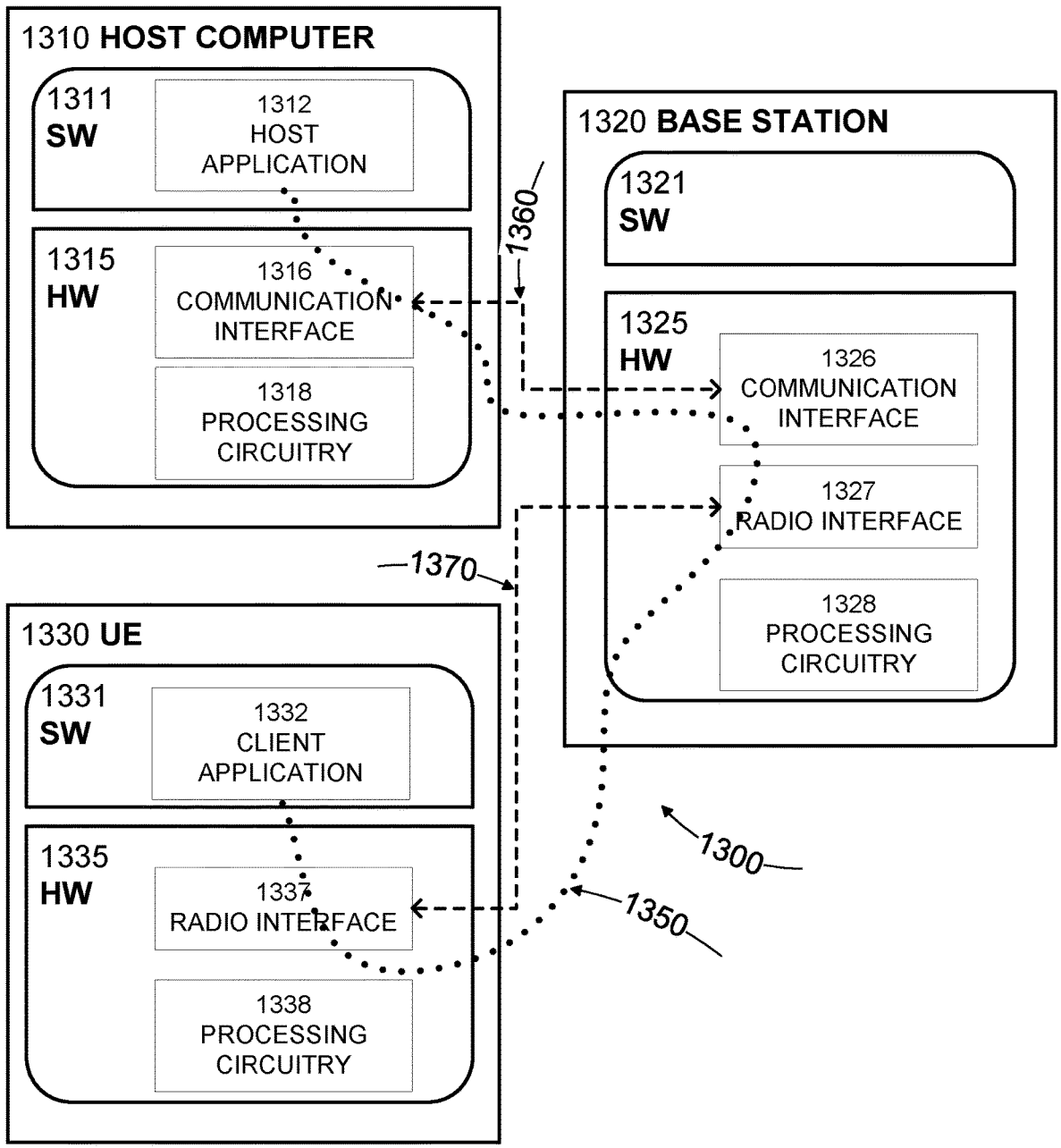
FIG. 13 is a block diagram of a host computer according to some embodiments.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions.

Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
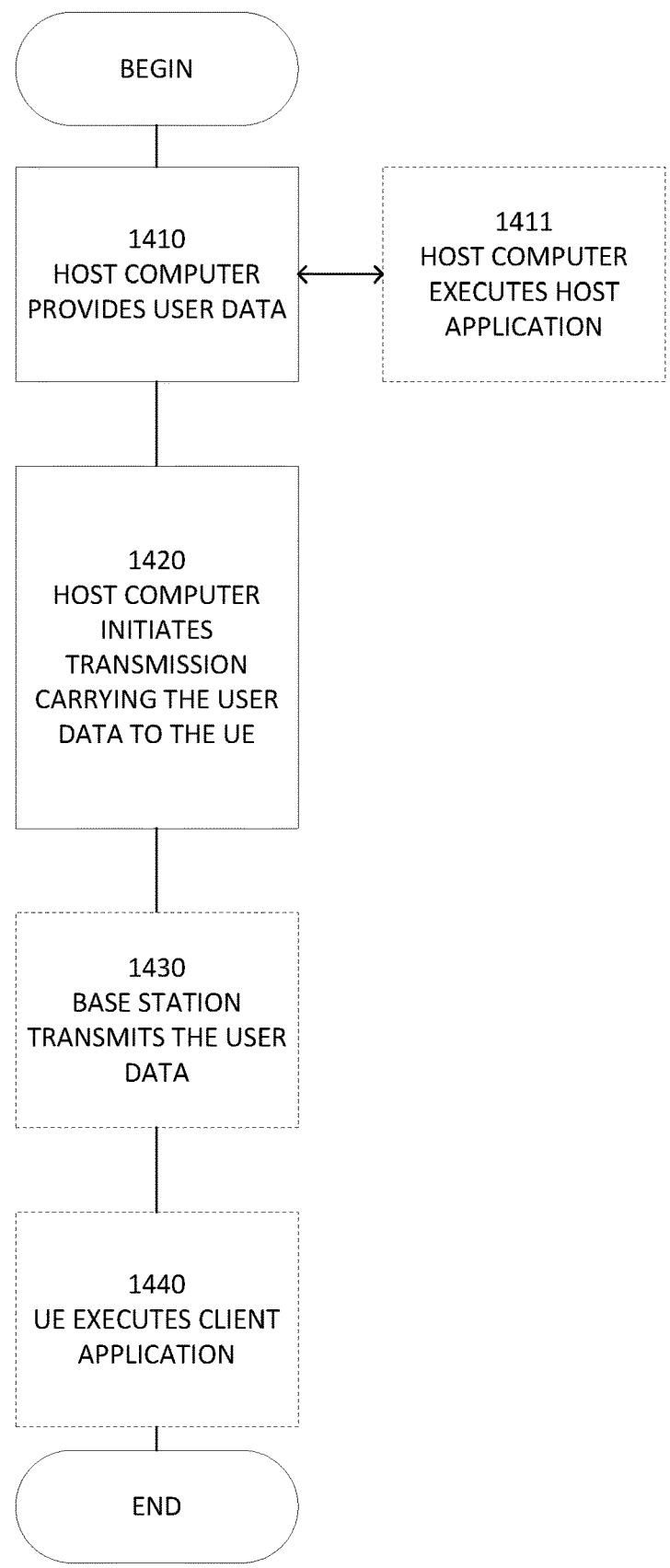
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
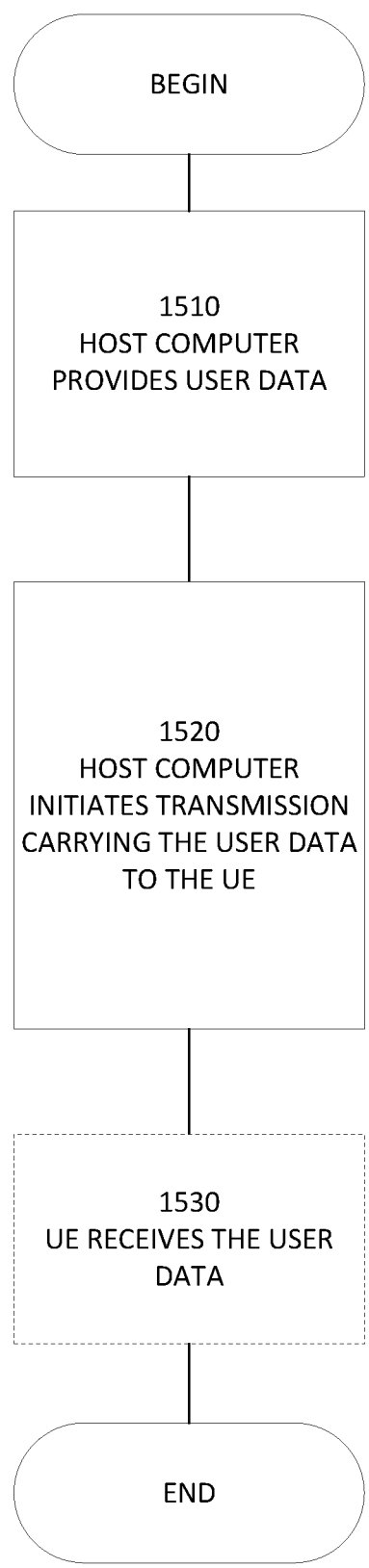
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
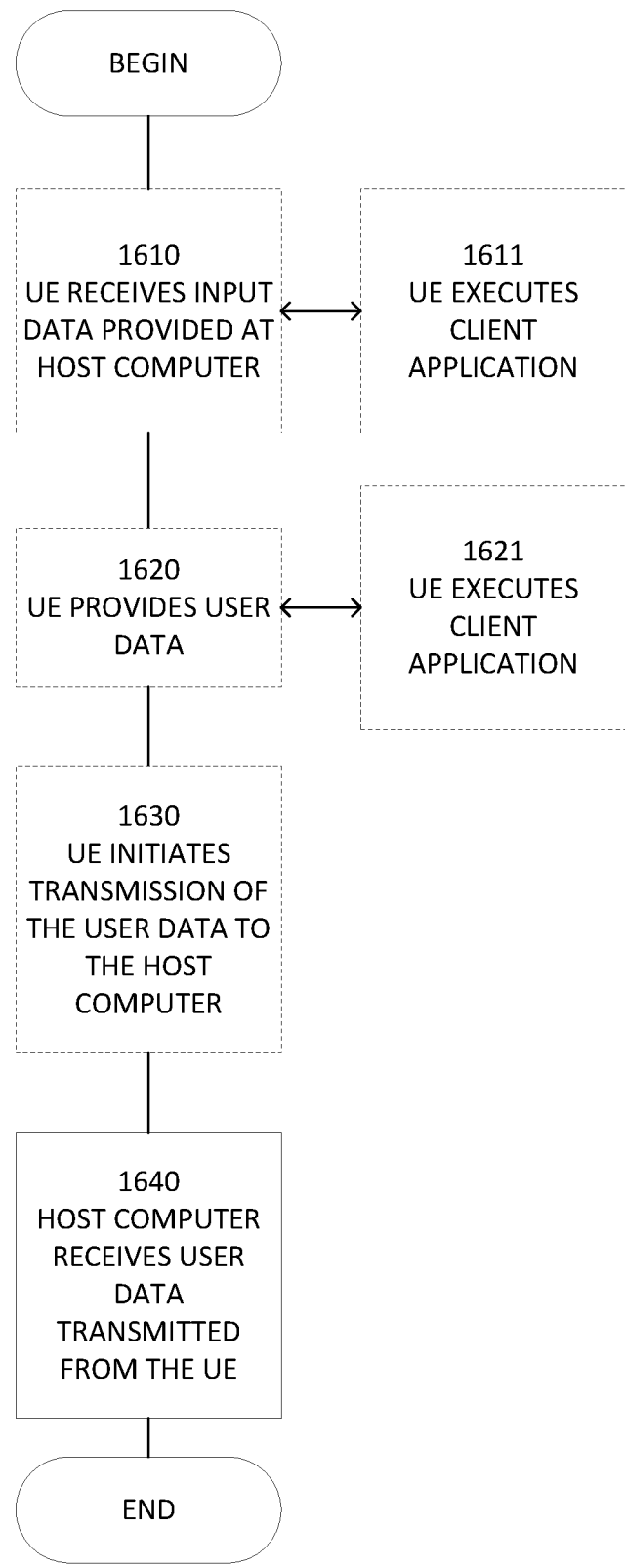
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
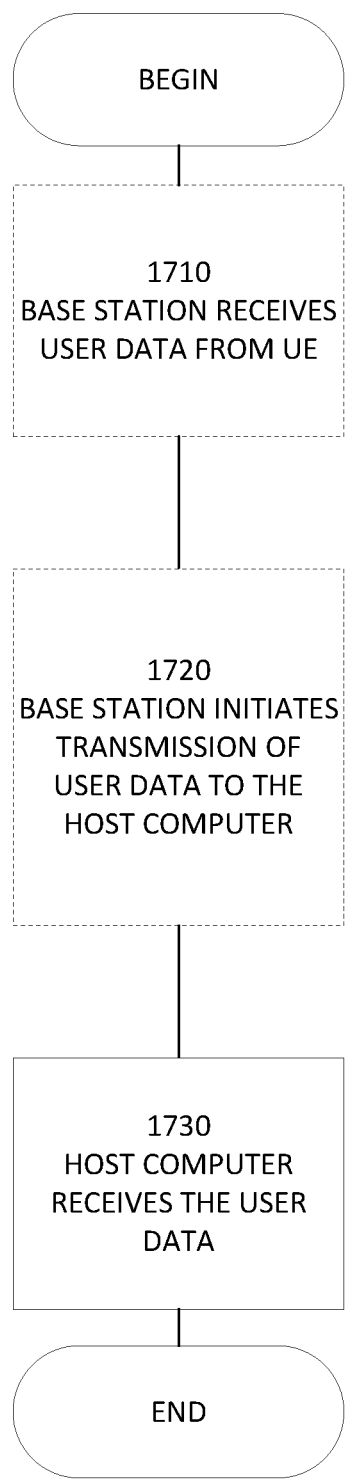
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a radio network node, the method comprising:
    transmitting, to a wireless device, a mapping that maps different candidate uplink signals in a set to different respective channel information;
    transmitting a downlink reference signal over a downlink channel;
    receiving an uplink signal from the wireless device over an uplink channel;
    jointly (i) identifying which candidate uplink signal in the set of candidate uplink signals is the received uplink signal; and (ii) determining an estimate of the uplink channel from the received uplink signal;

determining channel information implicitly conveyed by the identified candidate uplink signal, wherein different candidate uplink signals in the set implicitly convey different channel information, wherein determining the channel information implicitly conveyed by the identified candidate uplink signal comprises mapping the identified candidate uplink signal to channel information according to said mapping; and determining an estimate of the downlink channel based on the determined channel information and the determined estimate of the uplink channel.

2. The method of claim 1, wherein:

the set includes at least some uplink signals which are not pairwise orthogonal but all pairs of uplink signals in the set have a correlation below a threshold.

3. The method of claim 1, wherein the number of candidate uplink signals in the set is less than or equal to $$v = \frac{B}{N},$$

where B is a number or beams over-which the radio network node is configured to transmit and where N is a number of transmit antennas at the radio network node.

4. The method of claim 1, wherein the channel information implicitly conveyed by the identified candidate uplink signal is channel information determined by the wireless device from measurement of the downlink channel.

5. The method of claim 1, wherein the channel information is or encodes a precoder or beam selected from a codebook of multiple possible precoders or beams.

6. A method performed by a wireless device, the method comprising:

receiving, from a radio network node, a mapping that maps different candidate uplink reference signals in a set to different respective channel information, wherein different candidate uplink refence signals in the set implicitly convey different respective channel information;

receiving a downlink reference signal from the radio network node over a downlink channel;

determining channel information based on measurement of the downlink reference signal;

selecting, from among the multiple candidate uplink reference signals in the set, an uplink reference signal to transmit, based on the determined channel information and based on said mapping, wherein said selecting comprises selecting the uplink reference signal that the mapping maps to the determined channel information;

transmitting, to the radio network node over an uplink channel, the selected uplink reference signal that implicitly conveys the determined channel information.

7. The method of claim 6, wherein the set is a finite set of pairwise orthogonal uplink reference signals.

8. The method of claim 6, wherein the set is a finite set of uplink reference signals that includes at least some uplink reference signals which are not pairwise orthogonal but all pairs of uplink reference signals in the set have a correlation below a threshold.

9. The method of claim 6, wherein the number of candidate uplink reference signals in the set is less than or equal to $$v = \frac{B}{N},$$

where B is a number of beams over which the radio network node is configured to transmit and where N is a number of transmit antennas at the radio network node.

10. A radio network node comprising:
communication circuitry; and
processing circuitry configured to:
   transmit, to a wireless device, a mapping that maps different candidate uplink signals in a set to different respective channel information;
   transmit a downlink reference signal over a downlink channel;
   receive an uplink signal from the wireless device over an uplink channel;
   jointly (i) identify which candidate uplink signal in the set of candidate uplink signals is the received uplink signal; and (ii) determine an estimate of the uplink channel from the received uplink signal;
   determine channel information implicitly conveyed by the identified candidate uplink signal, wherein different candidate uplink signals in the set implicitly convey different channel information, wherein the channel information implicitly conveyed by the identified candidate uplink signal is determined by mapping the identified candidate uplink signal to channel information according to said mapping; and
   determine an estimate of the downlink channel based on the determined channel information and the determined estimate of the uplink channel.

11. The radio network node of claim 10, wherein the channel information implicitly conveyed by the identified candidate uplink signal is channel information determined by the wireless device from measurement of the downlink channel.

12. A wireless device comprising:
communication circuitry; and
processing circuitry configured to:
   receive, from a radio network node, a mapping that maps different candidate uplink reference signals in a set to different respective channel information, wherein different candidate uplink refence signals in the set implicitly convey different respective channel information;
   receive a downlink reference signal from the radio network node over a downlink channel;
   determine channel information based on measurement of the downlink reference signal;
   select, from among the multiple candidate uplink reference signals in the set, an uplink reference signal to transmit, based on the determined channel information and based on said mapping, wherein the processing circuitry is configured to select the uplink reference signal that the mapping maps to the determined channel information;
   transmit, to the radio network node over an uplink channel, the selected uplink reference signal that implicitly conveys the determined channel information.

13. The wireless device of claim 12, wherein the set is a finite set of pairwise orthogonal uplink reference signals.

14. The wireless device of claim 12, wherein the set is a finite set of uplink reference signals that includes at least some uplink reference signals which are not pairwise orthogonal but all pairs of uplink reference signals in the set have a correlation below a threshold.

15. The wireless device of claim 12, wherein the number of candidate uplink reference signals in the set is less than or equal to $$v = \frac{B}{N},$$

where B is a number of beams over which the radio network node is configured to transmit and where N is a number of transmit antennas at the radio network node.

16. The wireless device of claim 12, wherein the channel information is or encodes a precoder or beam selected from a codebook of multiple possible precoders or beams.

* * * * *